United States Patent
Mejbah Ul Alam et al.

(10) Patent No.: US 11,966,473 B2
(45) Date of Patent: Apr. 23, 2024

(54) METHODS AND APPARATUS TO DETECT SIDE-CHANNEL ATTACKS

(71) Applicant: Intel Corporation, Santa Clara, CA (US)

(72) Inventors: Mohammad Mejbah Ul Alam, Milpitas, CA (US); Justin Gottschlich, Santa Clara, CA (US); Shengtian Zhou, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 87 days.

(21) Appl. No.: 17/385,589

(22) Filed: Jul. 26, 2021

(65) Prior Publication Data
US 2022/0019666 A1    Jan. 20, 2022

Related U.S. Application Data

(63) Continuation of application No. 16/226,137, filed on Dec. 19, 2018, now Pat. No. 11,074,344.

(51) Int. Cl.
*G06F 21/56* (2013.01)
*G06F 21/55* (2013.01)
*G06N 3/08* (2023.01)

(52) U.S. Cl.
CPC .......... *G06F 21/566* (2013.01); *G06F 21/554* (2013.01); *G06F 21/556* (2013.01); *G06N 3/08* (2013.01); *G06F 2221/034* (2013.01)

(58) Field of Classification Search
CPC .... G06F 21/566; G06F 21/554; G06F 21/556; G06F 2221/034; G06N 3/08; G06N 3/088
See application file for complete search history.

(56) References Cited

U.S. PATENT DOCUMENTS 6,314,413 B1 *  11/2001  Otte .................. G06N 3/04
                                                706/15
6,421,467 B1 *  7/2002  Mitra ............... G06F 18/23211
                                                382/240

(Continued)

FOREIGN PATENT DOCUMENTS

CN     111339530 A      6/2020
DE     102019131231 A1  6/2020
WO     WO-2006096035 A1 *  9/2006  ......... H04L 63/0428

OTHER PUBLICATIONS

Zhang et al., "HomeAlone: Co-Residency Detection in the Cloud via Side-Channel Analysis," 2011 IEEE Symposium on Security and Privacy, 2011, 16 pages.

(Continued)

*Primary Examiner* — Meng Li
(74) *Attorney, Agent, or Firm* — JAFFERY WATSON MENDONSA & HAMILTON LLP

(57) ABSTRACT

Methods, apparatus, systems and articles of manufacture to identify a side-channel attack are disclosed. Example instructions cause one or more processors to generate an event vector based on one or more counts corresponding to tasks performed by a central processing unit; determine distances between the event vector and weight vectors of neurons in a self-organizing map; select a neuron of the neurons that results based on a determined distance; identify neurons that neighbor the selected neuron; and update at least one of a weight vector of the selected neuron or weight vectors of the neighboring neurons based on the determined distance of the selected neuron.

18 Claims, 6 Drawing Sheets

(56) References Cited

U.S. PATENT DOCUMENTS

| | | | |
|---|---|---|---|
| 10,192,170 | B2 | 1/2019 | Bates et al. |
| 11,074,344 | B2* | 7/2021 | Mejbah Ul Alam .... G06N 3/08 |
| 2002/0042793 | A1* | 4/2002 | Choi ..................... G06F 16/353 |
| 2002/0143973 | A1 | 10/2002 | Price |
| 2003/0140019 | A1* | 7/2003 | Gutta ....................... G06N 3/08 706/15 |
| 2007/0033017 | A1* | 2/2007 | Nair ........................ G09B 19/06 704/E15.045 |
| 2009/0070325 | A1* | 3/2009 | Gabriel ................... G06F 16/35 707/999.005 |
| 2011/0214157 | A1* | 9/2011 | Korsunsky .......... H04L 63/1425 726/1 |
| 2011/0238855 | A1* | 9/2011 | Korsunsky .......... H04L 63/1441 709/231 |
| 2012/0240185 | A1* | 9/2012 | Kapoor ............... H04L 41/0866 726/1 |
| 2013/0138669 | A1* | 5/2013 | Lu ........................... G06N 3/088 707/E17.014 |
| 2015/0074023 | A1* | 3/2015 | Gu ........................... G06N 3/08 706/20 |
| 2017/0148042 | A1* | 5/2017 | Sullivan ............. G06Q 30/0204 |
| 2017/0230410 | A1 | 8/2017 | Hassanzadeh et al. |
| 2018/0150494 | A1* | 5/2018 | Schulze ................ G06F 16/221 |
| 2018/0314533 | A1* | 11/2018 | Azhen ................ H04L 41/0823 |
| 2019/0080228 | A1* | 3/2019 | Seth ....................... G06V 10/82 |
| 2019/0098039 | A1 | 3/2019 | Gates et al. |
| 2019/0147162 | A1* | 5/2019 | Mejbah Ul Alam .. G06N 3/088 726/23 |
| 2019/0159735 | A1* | 5/2019 | Rundo ................... A61B 5/725 |
| 2019/0258951 | A1* | 8/2019 | Shuster .................. G06N 20/00 |
| 2019/0386884 | A1 | 12/2019 | Qi et al. |
| 2020/0012257 | A1 | 1/2020 | Bierweiler et al. |
| 2020/0377949 | A1* | 12/2020 | Jensen ................. C12Q 1/6883 |
| 2022/0019666 | A1* | 1/2022 | Mejbah Ul Alam . G06F 21/554 |

OTHER PUBLICATIONS

Yarom et al., "Flush+Reload: A High Resolution, Low Noise, L3 Cache Side-Channel Attack," This paper is included in the Proceedings of the 23rd USENIX Security Symposium, Aug. 20-22, 2014, The University of Adelaide, 15 pages.

Sherwood et al., "Discovering and Exploiting Program Phases," Published by the IEEE Computer Society, 2003, 10 pages.

Evtyushkin et al., "BranchScope: A New Side-Channel Attack on Directional Branch Predictor," ASPLOS18, Mar. 24-28, 2018, Williamsburg, VA, USA, Session 8A: Security and Protection, 15 pages.

Lipp et al., "Meltdown," arXiv:1801.01207v1, Jan. 3, 2018, 16 pages.

Kocher et al., "Spectre Attacks: Exploiting Speculative Execution," ARxIV:1801.01203V1, Jan. 3, 2018, 16 pages.

Maisuradze et al., "SPECULOSE: Analyzing the Security Implications of Speculative Execution in CPUs," Jan. 12, 2018, 15 pages.

Bleikertz et al., "Cloud Radar: Near Real-Time Detection of Security Failures in Dynamic Virtualized Infrastructures," ACM, Dec. 8-12, 2014, New Orleans, LA, USA, 10 pages.

Chiappetta et al., "Real time detection of cache-based side-channel attacks using Hardware Performance Counters," https://eprint.iacr.org/2015/1034.pdf, Article in Applied Soft Computing 49 Sep. 2016, 15 pages.

Demme et al., "On the Feasibility of Online Malware Detection with Performance Counters," ACM, 2013, 12 pages.

Goos et al., "Advances in Cryptology," Lecture Notes in Computer Science, Springer, Aug. 18-22, 1996, 11 pages.

Kocher et al., "Differential Power Analysis," Cryptography Research, Inc., https://www.paulkocher.com/doc/DifferentialPowerAnalysis.pdf, Sep. 1999, 11 pages.

Jann Horn, "Reading privileged memory with a side-channel," Project Zero, Jan. 3, 2018, https://googleprojectzero.blogspot.com/2018/01/reading-privileged-memory-- with-side.html, 28 pages.

Teuvo Kohonen, "Self-Organizing Maps," Springer Science & Business Media, Dec. 6, 2012, book, abstract only provided, 1 page.

Wikipedia, "Norm (mathematics)," https://en.wikipedia.org/wiki/Norm_(mathematics), this page was last edited on Oct. 30, 2018, 10 pages.

United States Patent and Trademark Office, "Non-Final Office Action," issued in connection with U.S. Appl. No. 16/226,137, dated Dec. 22, 2020, 9 pages.

United States Patent and Trademark Office, "Notice of Allowance and Fee(s) Due," issued in connection with U.S. Appl. No. 16/226,137, dated Apr. 7, 2021, 7 pages.

* cited by examiner

METHODS AND APPARATUS TO DETECT SIDE-CHANNEL ATTACKS

RELATED APPLICATION

This patent arises from a continuation of U.S. patent application Ser. No. 16/226,137, entitled "METHODS AND APPARATUS TO DETECT SIDE-CHANNEL ATTACKS," filed on Dec. 19, 2018. Priority to U.S. patent application Ser. No. 16/226,137 is claimed. U.S. patent application Ser. No. 16/226,137 is incorporated herein by reference in its entirety.

FIELD OF THE DISCLOSURE

This disclosure relates generally to processors, and, more particularly, to methods and apparatus to detect side-channel attacks.

BACKGROUND

Computing systems are utilized in various types of technologies to perform tasks and/or programs. Such computing systems include processors that carry out instructions by performing different operations specified by the instructions. The computing systems include memory and/or cache to store such instructions. The cache of a computing system is a small and fast memory that stores copies of data frequently used by processors.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
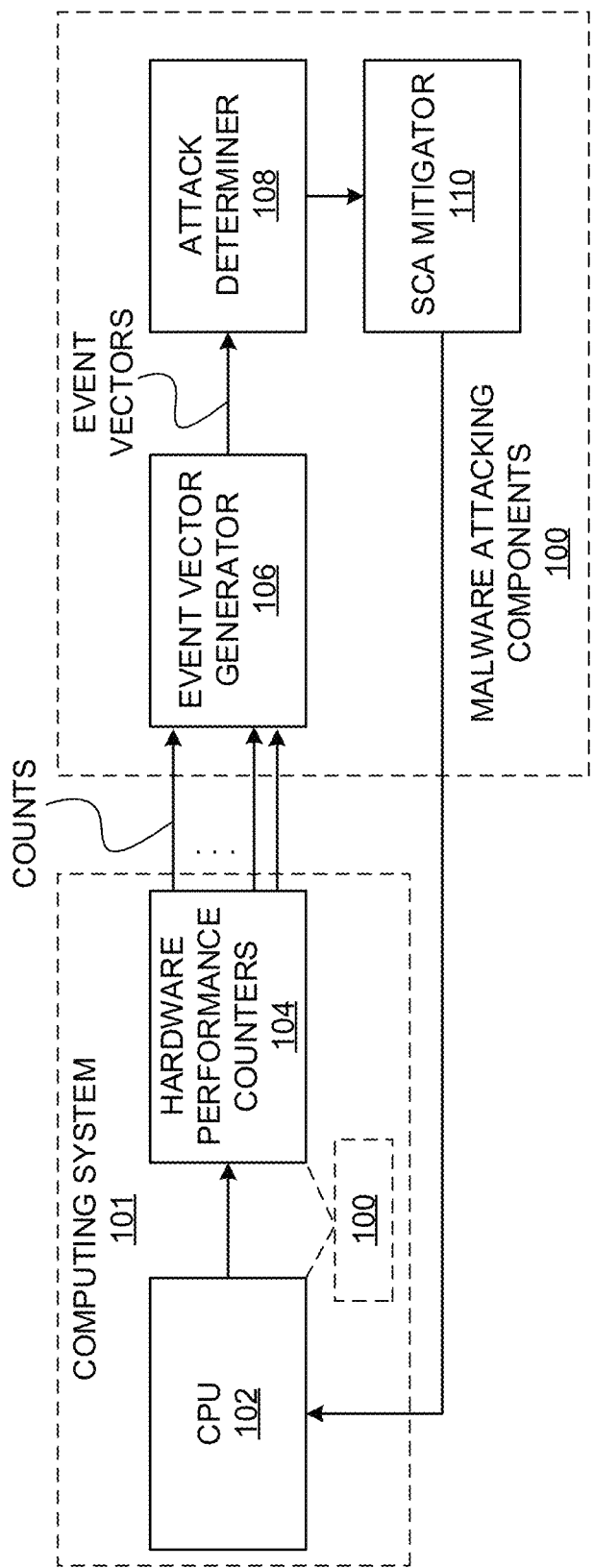
FIG. 1 is a block diagram of example malware attacking components to identify a side-channel attack in accordance with teachings of this disclosure

Computing systems, including personal computers and/or mobile devices, are commonly targeted by attackers to exploit such computing systems. A side-channel attack is type of cyber-attack (e.g., malware) that relies on side-channel information (e.g., cache access patterns, timing information, power consumption, electromagnetic leaks, sound, etc.). For example, a side-channel attack may involve an attacker program that collects side-channel information (e.g., cache misses) to extract sensitive data from a target program (e.g., a victim program) to exploit computing systems. Some side-channel attacks leverage the sharing of different functional units (e.g., cache, branch perdition units, etc.) inside of a processor between the attacker program and the victim program. In this manner, the attacker program may enter into a similar program phase (e.g., execution sequence) as the victim program. A program phase is an execution sequence that can be identified by distinct computational patterns carried out by the program (e.g., memory access phase, computation phase). Thus, a program executing tasks in the same program phase on the same physical core as another program could represent a potential side-channel attack program. As used herein, a task is program execution on a computing system.

Conventional techniques for detecting side-channel attacks detect signatures of known attacker programs. However, detecting signatures is not applicable for an increasingly growing number of new side-channel attacks. Other conventional techniques for detecting side-channel attacks include performing side-channel analysis techniques. However such conventional techniques adversely impact the performance of the operation of the computing system. Examples disclosed herein detect side-channel attacks by leveraging unsupervised machine learning, thereby resulting in to a lightweight detector of side-channel attacks that is effective for both known and unknown attacks using different side-channels.

Examples disclosed herein detect side-channel attacks by detecting co-resident program (e.g., programs sharing the same processor) that are in a similar program phase (e.g., using the same functional units). It may be the case that of two co-resident programs in a similar program phase, one of those programs is a side-channel attack. Examples disclosed herein utilize performance counters to detect temporal sharing of functional units inside a processor. Additionally, examples disclosed herein utilize a self-organizing kernel map (SOM) (e.g., an artificial neural network) to leverage the unsupervised learning of the hardware performance counters to create a discretized representation of phase-specific behavior. Examples disclosed herein train the SOM based on hardware performance counter values of programs as an input and organizes the counters from similar program phases to the same SOM neighborhoods. As used herein, a SOM neighborhood refers to a set of neurons that are directly connected (e.g., adjacent) in the SOM topology. Because an attacking program may execute the same program phase on the phase physical core as another program during a side-channel attack, a side-channel attack can be identified based on a similar/same program phase. Accordingly, examples disclosed herein track neighborhood programs and report potential side-channel attacks when a program appears (e.g., occurs) more than a threshold number of times in the SOM neighborhood of the candidate program. Utilizing hardware performance counters provides a lightweight tracking of events to characterize program executions. Additionally, the SOM-based design enables an online, automatic, and adaptive detection of phases of the programs executing in a processor.

FIG. 1 is a block diagram of example malware attacking components 100 that may be used in conjunction with teachings of this disclosure to detect a side-channel attack of an example computing system 101. The example computing system 101 includes an example central processing unit (CPU) 102 and example hardware performance counters 104. The example malware attacking components 100 includes an example event vector generator 106, an example attack determiner 108, and an example side-channel attack (SCA) mitigator 110. Although the block diagram of FIG. 1 includes the malware attacking components 100 as separate from the computing system 101, the malware attacking components 100 (e.g., include the event vector generator 106, the attack determiner 108, and/or the SCA mitigator 110) may be implemented as part of the example computing system 101. For example, the CPU 102 may implement the malware attacking components 100.

The example hardware performance counters 104, the example event vector generator 106, the example attack determiner 108, or the example SCA mitigator 110 of FIG. 1 may be implemented by hardware, software, firmware and/or any combination of hardware, software and/or firmware. Thus, for example, any of the example hardware performance counters 104, the example event vector generator 106, the example attack determiner 108, or the example SCA mitigator 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). An example implementation of the example hardware performance counters 104, the example event vector generator 106, the example attack determiner 108, or the example SCA mitigator 110 of FIG. 1 in a processor is further described below in conjunction with FIG. 6.

The example CPU 102 of FIG. 1 may be an embedded system, an field programmable gate array, a share-memory controller, a network on-chip, a networked system, and/or any other processing system that includes a processor, memory, and/or cache. The example CPU 102 may execute a victim program that could be attacked by an attacking program. During a side-channel attack (e.g., malware corresponding to a cache-based side-channel attack), the attacking program and a victim program executed by the CPU 102 perform a series of memory accesses. The attacker program and the victim program may enter into a similar program phase in a hardware-side-channel attack, where the victim and attacker program share a functional unit. A program phase represents a unique period of a program's execution, that may repeat as the program continues to execute. The program phases change as the program executes (e.g., memory phase to read in data, followed by a number of computation phases when data is computed on). Each program phase may correspond to the same hardware in the CPU 102. For example a floating-point unit is only used in the floating-point phase.

The example hardware performance counters 104 of FIG. 1 are a set of registers that can be used to monitor a wide range of hardware performance events (e.g., instructions executed, cycles elapsed, cache misses, etc.). The example hardware performance counters 104 are used to detect the tasks corresponding to program phases of programs (e.g., victim or attacker programs) executing by the CPU 102. For example, the hardware performance counters 104 collect a set of hardware events for the tasks running in the CPU 102 by setting a fixed sampling frequency. The hardware performance counters 104 output one or more counts corresponding to a specific task. For example, a specific task executing in the program may correspond to a specific number and or types of hardware performance events. Accordingly, when the specific task is performed by the CPU 102, the hardware performance counters 104 may output one or more counts corresponding the specific number and/or type of hardware performance events.

The event vector generator 106 of FIG. 1 converts the counts from the hardware performance counters 104 into an event vector representative of the program phase. The event vector represents performance events that characterize tasks executed by the CPU 102. For example, the event vector generator 106 may include a look-up table that corresponds to counts to event vectors representative of program phases and/or tasks. Because a task performed by the CPU 102 is tracked by the hardware performance counters 104 to generate counts based on the task and the event vector translates the counts to an event vector, the event vector corresponds to a program phase of the CPU 102. The event vector generator 106 transmits the event vectors to the attack determiner 108 to train a neural network/SOM and, once trained, to identify side channel effects.

The example attack determiner 108 of FIG. 1 includes a neural network that utilizes a self-organizing map to detect side-channel attacks. Prior to training, the neural network/SOM may be a two dimensional grid topology of neurons. Alternatively, the neural network/SOM may be modeled as a multi-dimensional (e.g., three or more dimensions) grid of neurons. Each neuron is associated with a different weight vector and a coordinate in the grid.

The weight vector is the same length as the event vector. The example attack determiner 108 trains the neural network/SOM based on event vectors corresponding to tasks executed by the CPU 102. For example, when an event vector is received, the attack determiner 108 identifies a neuron in the neural network/SOM whose weight vector comes closest to the event vector. This neuron, which is called winning neuron, is selected based on a distance (e.g., Euclidean distance, Mahalanobis distance, squared Euclidean distance, etc.) between the weight vector of neurons and the event vector. Once the winning neuron is selected, the weights of the winning neuron and/or any neighboring (e.g., adjacent in a coordinate plane) neuron are adjusted based on their distance (e.g., Euclidean distance) from the input event vector and the winning neuron. For example, the weight update for each neuron at (i,j) position in the two dimensional grid is: $\Delta w_{i,j} = \eta * S * (x - w_{i,j})$, where $w_{i,j}$ is the weight vector of the neuron, x is the input vector, and S is the Euclidean distance between $w_{i,j}$ and weights of the winning neuron. A learning rate, $\eta$, is set by the user, manufacturer, and/or customer during training, which controls the rate of update. These weight updates move the winning neuron and the neighboring neurons towards the event vector in a scaled manner. The trained neural network/SOM corresponds to a plurality of neighboring neurons, where each neighboring neuron corresponds to a similar program phase/task (e.g., similar vector clusters corresponding to similar tasks are located in the same neighborhood). Accordingly, any event vector mapped to a neuron has a similar program phase to neighboring neurons representative of similar tasks.

After a threshold number of event vectors are used to train the neural network/SOM, and in response to obtaining an event vector and mapping/matching the event vector to a particular neuron, the attack determiner 108 stores data corresponding to phase/task pairs (e.g., neighboring neuron pairs or task pairs) corresponding to the neighboring neurons of the matched neuron of the neural network/SOM into a buffer. A number of phase/task pairs stored in the buffer or a count corresponding to each phase/task pairs exceeding a threshold number corresponds to a side-channel attack due to the matching program phases. Because an attacking program may execute the same program phase on the phase physical core as another program during a side-channel attack, a side-channel attack can be identified based on a similar/same program phase. Thus, because neighboring neurons correspond to a similar program phase, having more than a threshold number of phase pairs in the fixed-sized first-in first-out (FIFO) buffer corresponds to side-channel attack. Accordingly, the example attack determiner 108 identifies a side-channel attack based on a number of phase/task pairs that exceed a threshold. Additionally, the example attack determiner 108 selects a mitigation technique for mitigating the side-channel attack (e.g., based on anomalies of the tasks that are being executed during the side-channel attack). An example implementation of the attack determiner 108 is further described below in conjunction with FIG. 2.

The example SCA mitigator 110 of FIG. 1 mitigates the side-channel attack in response to an identified attack. The SCA mitigator 110 uses the selected mitigation technique of the example attack determiner 108 on the example CPU 102 to mitigate the attack. For example, the SCA mitigator 110 may attempt to eliminate or reduce the release of leaked data obtained by the attacker and/or may attempt eliminate the relationship between the leaked information (e.g., obtained by the attacker) and secret data through randomization of ciphertext that transforms the secret data.

Figure 2:
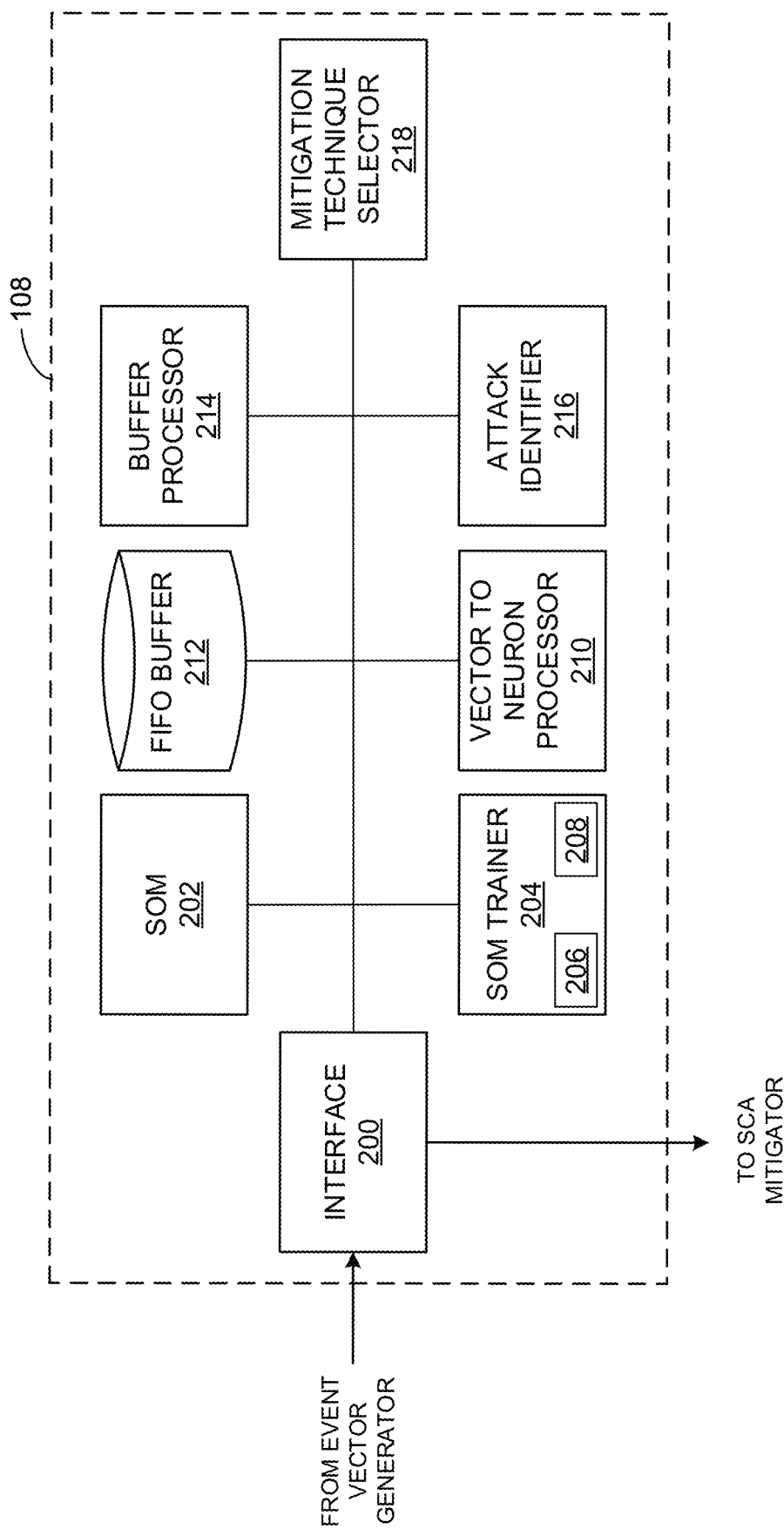
FIG. 2 is a block diagram of an example implementation of the attack determiner of FIG. 1.

FIG. 2 is a block diagram of an example implementation of the attack determiner 108 of FIG. 1. The example attack determiner 108 of FIG. 2 includes an example interface 200, an example SOM 202, an example SOM trainer 204, an example distance determiner 206, an example weight adjuster 208, an example vector-to-neuron processor 210, an example FIFO buffer 212, an example buffer processor 214, an example attack identifier 216, and an example mitigation technique selector 218. The example SOM trainer 204 includes the example distance determiner 206 and the example weight adjuster 208.

The example the example interface 200, the example SOM 202, the example SOM trainer 204, the example distance determiner 206, the example weight adjuster 208, the example vector-to-neuron processor 210, the example FIFO buffer 212, the example attack identifier 216, the example buffer processor 214, the example mitigation technique selector 218, and/or, more generally the example attack determiner 108 of FIG. 2 may be implemented by hardware, software, firmware and/or any combination of hardware, software and/or firmware. Thus, for example, any of the example interface 200, the example SOM 202, the example SOM trainer 204, the example distance determiner 206, the example weight adjuster 208, the example vector-to-neuron processor 210, the example FIFO buffer 212, the example attack identifier 216, the example buffer processor 214, the example mitigation technique selector 218, and/or, more generally the example attack determiner 108 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). An example implementation of the example interface 200, the example SOM 202, the example SOM trainer 204, the example distance determiner 206, the example weight adjuster 208, the example vector-to-neuron processor 210, the example FIFO buffer 212, the example attack identifier 216, the example buffer processor 214, the example mitigation technique selector 218, and/or, more generally the example attack determiner 108 of FIG. 2 in a processor is further described below in conjunction with FIG. 6.

The example interface 200 of FIG. 2 is a structural component that obtains vector(s) from the example event vector generator 106. Additionally, when a side-channel attack has been identified and a mitigation technique for the side-channel attack has been selected, the interface 200 transmits the selected mitigation technique and any other relevant information to the example SCA mitigator 110 of FIG. 1.

The example SOM 202 is a neural network that organizes neurons in a multi-dimensional grid. In some examples, the neurons correspond to coordinates (e.g., an x and y coordinate). Each neuron includes two or more neighboring neurons. In a two-dimensional grid, any neuron that is one unit away from a particular neuron is a neighbor. For example, neighboring neurons for a particular neuron located at coordinate (x, y) are located at coordinates (x+1, y), (x−1, y), (x, y+1), and (x, y−1) (e.g., the adjacent coordinate locations), thereby corresponding to a neighborhood of neurons. Each neuron corresponds to a weight vector, where neighboring vectors have similar weight vectors. Initially, the neurons have predefined weight vectors that are the same dimensions of the event vector.

During training, the weight vectors are adjusted corresponding to the obtained event vectors. Once the SOM 202 is trained, the SOM 202 includes to neighborhoods of neurons corresponding to tasks executed by the CPU 102, where each neighborhood corresponds to a similar program phase of the CPU 102.

The example SOM trainer 204 of FIG. 2 is a structural component that trains the SOM 202 based on obtained event vectors corresponding to tasks executed by the example CPU 102. For example, during training, the SOM trainer 204 utilizes the example distance determiner 206 to determine a distance (e.g., Euclidean distance, Mahalanobis distance, squared Euclidean distance, etc.) between the event vector and the weight vectors of the neurons (e.g., $d_n = \|e_t - w_n\|$, where $d_n$ is the Euclidean distance between the event vector and weight vector of neuron n, $e_t$ is the obtained event vector, and $w_n$ is the weight vector of neuron n). The example SOM trainer 204 determines a winning neuron based on the neuron with the smallest distance from the event vector. In some examples, because the weight vectors of neighboring neurons are similar, the SOM trainer 204 may jump from neighborhoods when the distance is of the event vector to a weight vector of a neuron is too high (e.g., in a manner similar to a bubble sort). Once the SOM trainer 204 selects a winning neuron, the SOM trainer 204 utilizes the example weight adjuster 208 to adjust the weights of the winning vector and the weights of the neighboring vectors based on the winning distance (e.g., Euclidean distance, Mahalanobis distance, squared Euclidean distance, etc.). For example, the weight update for each neuron at (i,j) position in the two dimensional grid is: $\Delta w_{i,j} = \eta * S * (x - w_{i,j})$, where $w_{i,j}$ is the weight vector of the neuron, x is the input vector, and S is the Euclidean distance between $w_{i,j}$ and weights of the winning neuron. A learning rate, $\eta$, is set by the user, manufacturer, and/or customer during training, which controls the rate of update. These weight updates move the winning neuron and the neighboring neurons towards the event vector in a scaled manner. In some examples, the SOM trainer 204 determines if a threshold number of event vectors has been used to train the example SOM 202 to end the training of the SOM 202. In this manner, the trained SOM 202 can be used to identify side-channel attacks. In some examples, the SOM trainer 204 determines if a threshold number of event vectors has been used to train the example SOM 202 and indicates that the SOM 202 is trained and continues to update the weights of the weight vectors of the SOM 202 while the attack determiner 108 identifies attacks.

The example vector-to-neuron processor 210 of FIG. 2 is a structural component that maps an event vector (e.g., corresponding to one or more tasks being executed by the CPU 102) to a neuron based on the weight vector of the neuron matching, or being closest to, the event vector. For example, the vector-to-neuron processor 210 may utilize a comparator to compare the event vector to the weight vectors of the neurons in the SOM 202 to identify a match. Additionally or alternatively, the example vector-to-neuron processor 210 may map the event vector to a neuron based on the smallest distance (e.g., Euclidean distance, Mahalanobis distance, squared Euclidean distance, etc.) between the event vector and the weight vector of the neuron. Additionally, the example vector-to-neuron processor 210 determines the neighboring neurons to the mapped neuron. For example, if the vector-to-neuron processor 210 determines that maps an event vector to a neuron at location (x, y), the vector-to-neuron processor 210 identifies the neighboring neurons to be the neurons located at coordinates (x+1, y), (x−1, y), (x, y+1), and (x, y−1).

The example FIFO buffer 212 of FIG. 2 stores phase/task pairs (e.g., generated by the buffer processor 214) in a first in first out manner. For example, when the FIFO buffer 212 discards (e.g., pops) a stored phase/task pair (e.g., to make room for new phase/task pairs), the FIFO buffer 212 discards the oldest phase/task pair (e.g., the phase/task pair that was first stored in the FIFO buffer 212). The FIFO buffer 212 discards the oldest phase/task pair when the FIFO buffer 212 is full and a new phase/task pair is to be stored in the FIFO buffer 212 (e.g., based on instructions from the buffer processor 214). Alternatively, the FIFO buffer 212 may store counts corresponding to each phase/task pair. In this manner, when any one of the counts exceeds the threshold, a side-channel attack may have occurred. The FIFO buffer 212 may be sized to hold a preset number of phase/task pairs based on user and/or manufacturer preferences. The size of the FIFO buffer 212 is proportional to the number of tasks running in the system. For example, a larger number of tasks running in a system, a larger sized FIFO buffer is more appropriate than a smaller number of tasks running in the system.

The example buffer processor 214 of FIG. 2 is a structural component that determines neighboring phase/task pairs based on the mapped neuron and identified neighboring neurons. For example, if the mapped neuron is identified as '1' and the neighboring neurons are identified as '2,' '3,' '4,' and '5,' the buffer processor 214 determines the phase/task pairs to be [1, 2], [1, 3], [1, 4], and [1, 5]. The example buffer processor 214 instructs the example FIFO buffer 212 to store the determined phase/task pairs. As described above, if the FIFO buffer 212 is full before or during the storing of the phase/task pairs, the oldest stored phase/task pair(s) is/are removed to make room for the new phase/task pairs.

The example attack identifier 216 of FIG. 2 tracks the amount of each phase/task pair and/or count corresponding to the phase/task pairs identified by the buffer processor 214 that is stored in the FIFO buffer 212. For example, the attack identifier 216 may utilize a comparator to compare the total numbers of each unique phase/task pair stored in the FIFO buffer 212 to a preset threshold (e.g., a domain specific threshold). If the preset threshold is small, the detect could produce an increased number of false positive results. Thus, a domain specific threshold may be set by using a priori information (e.g., calculate the probability of sage programs to be in a similar phase by using the number of different phases in the safe software programs, which are expected to execute in the system). As described above, because an attacking program may execute the same program phase on the phase physical core as another program during a side-channel attack, a side-channel attack can be identified based on a similar/same program phase. Accordingly, because neighboring neurons in the SOM 202 correspond to a similar program phase, having more than a threshold number of phase pairs in the fixed-sized FIFO buffer 212 corresponds to side-channel attack. When the number of a particular phase/task pair is above the preset threshold, the example attack identifier 216 determines that a side-channel attack has occurred and flags the attack.

The example mitigation technique selector 218 of FIG. 2 is a structural component that selects a mitigation technique from a plurality of techniques based on the types of anomalies corresponding to the attack. For example, having more than a threshold amount of first phase/task pairs (e.g., corresponding to a cache access phase) may correspond to a first mitigation technique (e.g., a cache-based side-channel attack mitigation technique) while having more than a threshold amount of second phase/task pairs may correspond to a second mitigation technique. Additionally or alternatively, there may be other factors that the mitigation technique selector 218 may utilize to select a mitigation technique for the side-channel attack. In some examples, the mitigation technique includes transmitting an alert to a user and/or administrator of the computing system 101.

Figure 3:
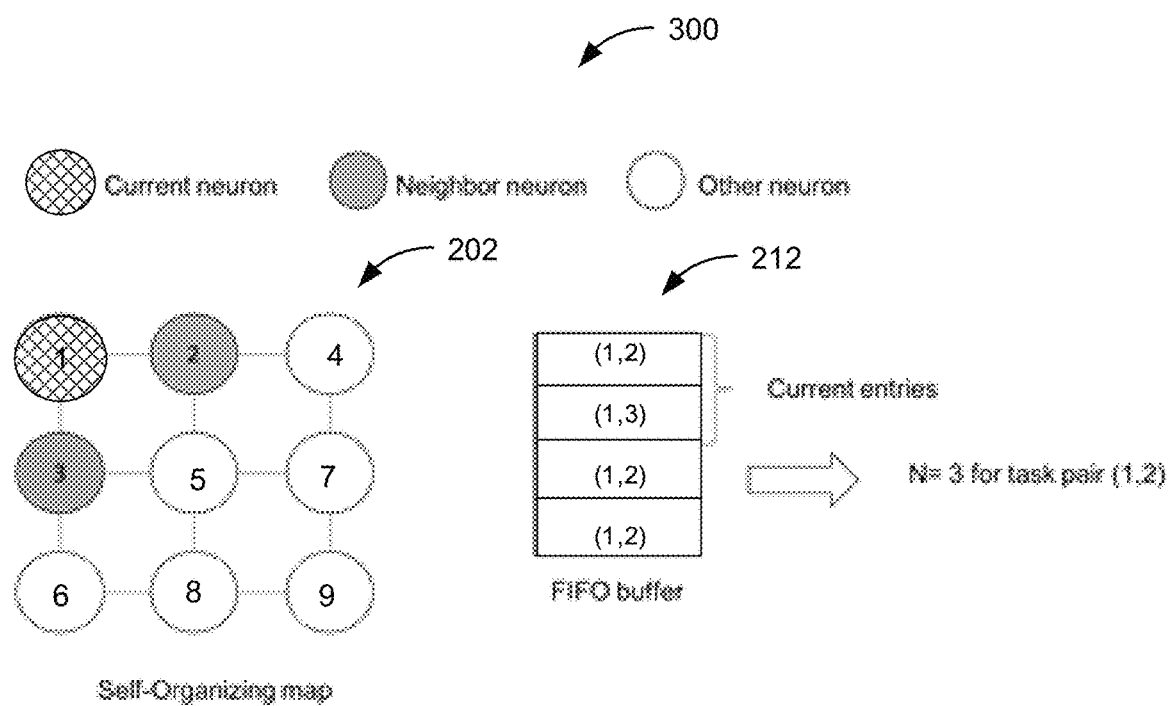
FIG. 3 is an example illustration of how the example attack determiner of FIGS. 1 and/or 2 identifies a side-channel attack.

FIG. 3 is an example illustration 300 of how the example attack determiner 108 of FIGS. 1 and/or 2 identifies a side-channel attack. The example illustration 300 includes the example SOM 202 and the example FIFO buffer 212 of FIG. 2. In the example illustration 300, the example SOM 202 is a three-by-three grid that has been trained by the example SOM trainer 204 of FIG. 2 based on event vectors corresponding to tasks performed by the CPU 102 of FIG. 1. Additionally, the example FIFO buffer 212 is sized to include four phase/task pairs. However, the SOM 202 and the example FIFO buffer 212 may be sized to any size based on the characteristics of the CPU 102 and/or based on user and/or manufacturer preferences.

The example SOM 202 of FIG. 3 includes nine neurons 1-9. Each neuron includes neighbors located one unit apart from the neurons in the x direction and the y direction. For example, neuron 1 has neighbors neurons 2 and 3 (e.g., corresponding to a first neighborhood), neuron 2 has neighbors 1, 5, and 4 (e.g., corresponding to a second neighborhood), neuron 3 has neighbors neurons 1, 5, and 6 (e.g., corresponding to a third neighborhood), etc. Because the SOM 202 has been trained, neighboring neurons corresponds to similar program phases.

The example FIFO buffer 212 of FIG. 3 stores phases pairs corresponding to an obtained event vector mapped to a neuron. In the example illustration 300, an event vector is obtained that is mapped to the neuron 1. Because neuron 1 has neighbor neurons 2 and 3, the attack determiner 108 identifies two phase/task pairs for neuron 1: (1, 2) and (1, 3). Accordingly, the phase/task pairs (1, 2) and (1, 3) are stored in the FIFO buffer 212. In another example, if the obtained event vector was mapped to neuron 3, the phase/task pairs of neuron 3 (e.g., (1, 3), (3, 5), and (3, 6)) would be stored in the FIFO buffer 212. Alternatively, the FIFO buffer 212 may store a count corresponding to the identified phase/task pairs. As described above in conjunction with FIG. 2, the attack determiner 108 tracks the number (N) and/or count of each unique phase/task pair in the FIFO buffer 212 to determine if the number(N) is above a threshold. In the example illustration 300, the attack determiner 108 determines that there are three phase/task pairs for (1, 2) (N=3). If the preset threshold is set to two, for example, the attack determiner 108 would determine that a side-channel attack has occurred and/or is occurring.

While an example manner of implementing the example attack determiner 108 of FIG. 1 is illustrated in FIG. 2, one or more of the elements, processes and/or devices illustrated in FIG. 2 may be combined, divided, re-arranged, omitted, eliminated and/or implemented in any other way. Further, the example hardware performance counters 104, the example event vector generator 106, the example SCA mitigator 110, the example interface 200, the example SOM 202, the example SOM trainer 204, the example distance determiner 206, the example weight adjuster 208, the example vector-to-neuron processor 210, the example FIFO buffer 212, the example attack identifier 216, the example buffer processor 214, the example mitigation technique selector 218, and/or, more generally the example attack determiner 108 of FIGS. 1 and/or 2 may be implemented by hardware, software, firmware and/or any combination of hardware, software and/or firmware. Thus, for example, any of the example hardware performance counters 104, the example event vector generator 106, the example SCA mitigator 110, the example interface 200, the example SOM 202, the example SOM trainer 204, the example distance determiner 206, the example weight adjuster 208, the example vector-to-neuron processor 210, the example FIFO buffer 212, the example attack identifier 216, the example buffer processor 214, the example mitigation technique selector 218, and/or, more generally the example attack determiner 108 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hardware performance counters 104, the example event vector generator 106, the example SCA mitigator 110, the example interface 200, the example SOM 202, the example SOM trainer 204, the example distance determiner 206, the example weight adjuster 208, the example vector-to-neuron processor 210, the example FIFO buffer 212, the example attack identifier 216, the example buffer processor 214, the example mitigation technique selector 218, and/or, more generally the example attack determiner 108 of FIGS. 1 and/or 2 is and/or are hereby expressly defined to include a non-transitory computer readable storage device or storage disk such as a memory, a digital versatile disk (DVD), a compact disk (CD), a Blu-ray disk, etc. including the software and/or firmware. Further still, the example attack determiner 108 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
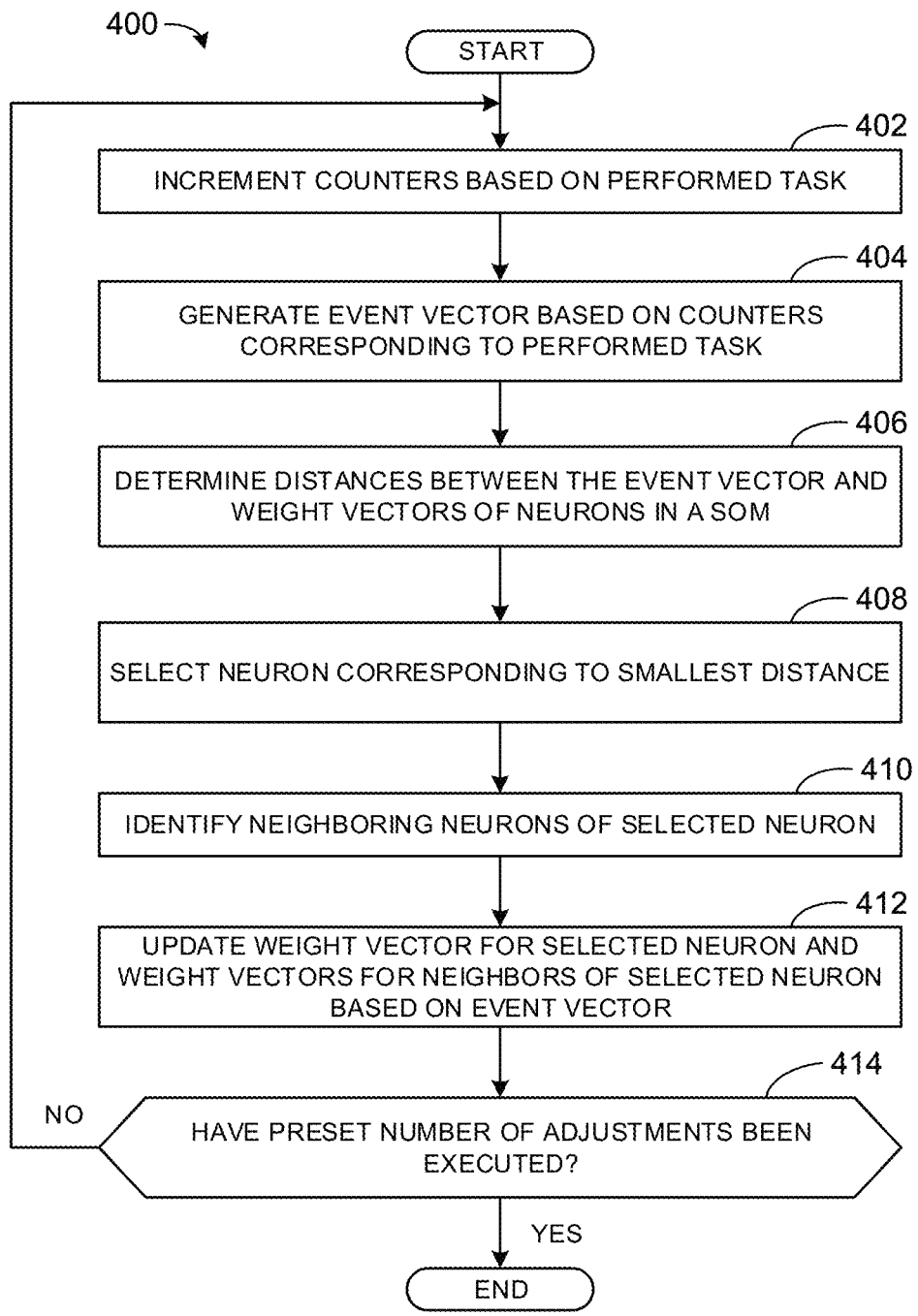
FIGS. 4-5 are flowcharts representative of example machine readable instructions that may be executed to implement the example attack determiner of FIGS. 1 and/or 2.
Figure 5:
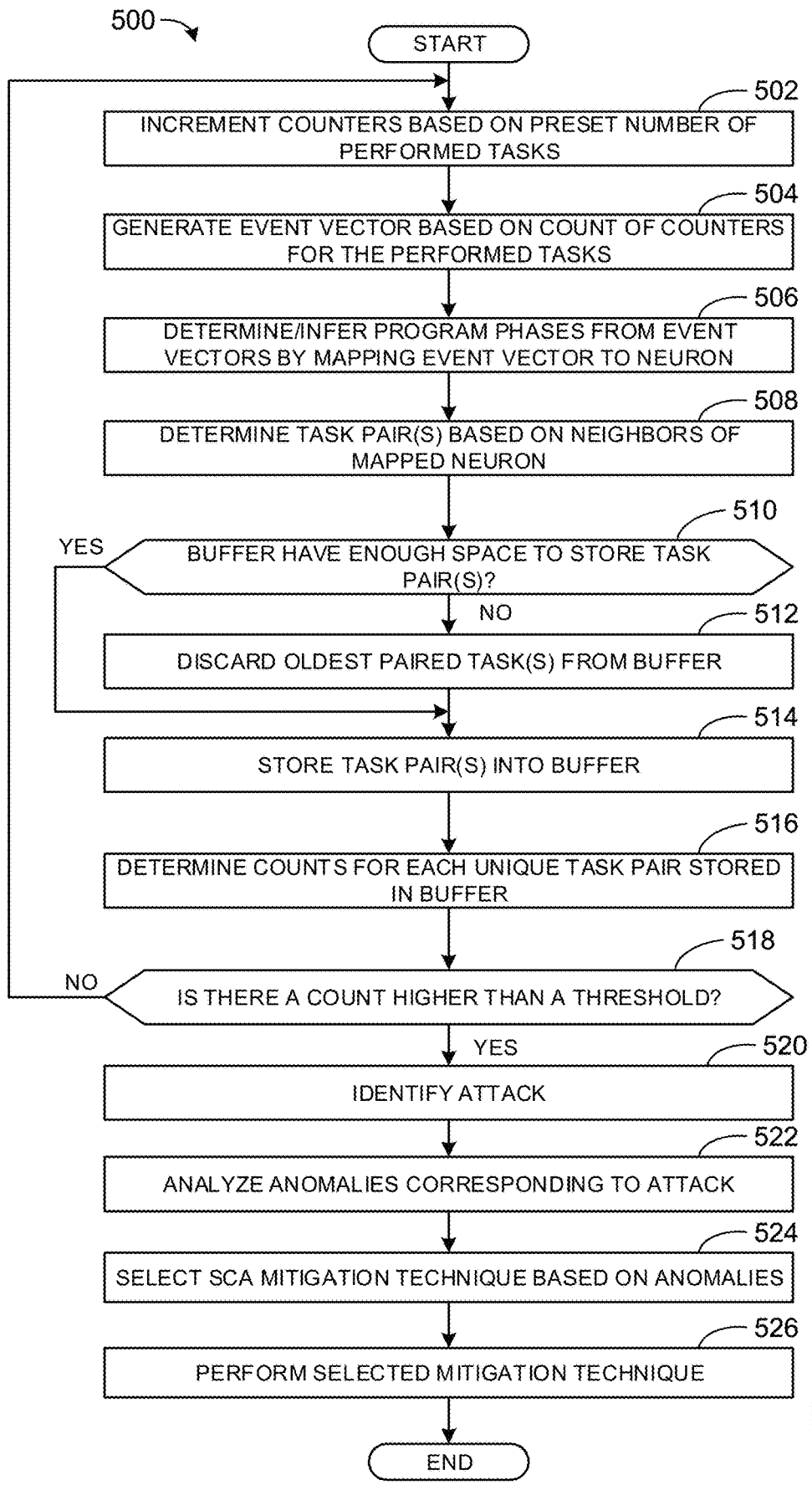

Flowcharts representative of example hardware logic, machine readable instructions, hardware implemented state machines, and/or any combination thereof for implementing the hardware performance counters 104, the event vector generator 106, the example attack determiner 108, and/or the example SCA mitigator 110 of FIG. 1 and/or FIG. 2 are shown in FIGS. 4-5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4-5, many other methods of implementing the hardware performance counters 104, the event vector generator 106, the example attack determiner 108, and/or the example SCA mitigator 110 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in that information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 4 is an example flowchart 400 representative of example machine readable instructions that may be executed by the example implementation of the example hardware performance counters 104, the example event vector generator 106, and/or the attack determiner 108 of FIGS. 1 and/or 2 to train the example SOM 202 of FIG. 2. Although the flowchart 400 of FIG. 4 is described in conjunction with the example hardware performance counters 104, the example event vector generator 106, and/or the attack determiner 108 of FIGS. 1 and/or 2, other type(s) of hardware performance counter(s), event vector generator(s), attack determiner(s), and/or other type(s) of processor(s) may be utilized instead.

At block 402, the example hardware performance counters 104 increment counters based on a task being performed by the example CPU 102. For example, the hardware performance counters 104 increment counts to detect program phases corresponding to the tasks being performed by the CPU 102. At block 404, the example event vector generator 106 generates an event vector based on the count of the counters corresponding to the performed task. For example, the event vector generator 106 may utilize a lookup table that converts combination of counts into an event vector.

At block 406, the example SOM trainer 204 utilizes the distance determiner 206 to determine the distances (e.g., Euclidean distances, Mahalanobis distances, squared Euclidean distances, etc.) between the event vector and weights vectors of the neurons in the example SOM 202. For example, the distance determiner 206 determines $d_n = \|e_t - w_n\|$, for the event vector and weight vectors of the neurons in the SOM 202. At block 408, the example SOM trainer 204 selects the neuron corresponding to the smallest distance. The neuron corresponding to the smallest distance (e.g., Euclidean distance, Mahalanobis distance, squared Euclidean distance, etc.) is the neuron that most closely represents the event vector.

At block 410, the example SOM trainer 204 identifies the neighboring neurons of the selected neuron. For example, when the neurons are set up in a two dimensional grid, the neighboring neurons of a selected neuron located at (x, y) are located at coordinates (x+1, y), (x−1, y), (x, y+1), and (x, y−1). At block 412, the example weight adjuster 208 of the example SOM trainer 204 updates the weight vector of the selected neuron and the weight vectors of the neighboring neurons based on the distance. For example, the weight update for each neuron at (i,j) position in the two dimensional grid is: $\Delta w_{i,j} = \eta * S * (x - w_{i,j})$, where $w_{i,j}$ is the weight vector of the neuron, x is the input vector, and S is the Euclidean distance between $w_{i,j}$ and weights of the winning neuron. A learning rate, $\eta$, is set by the user, manufacturer, and/or customer during training, which controls the rate of update. These weight updates move the winning neuron and the neighboring neurons towards the event vector in a scaled manner. In this manner, during training each neuron neighborhood correspond to a similar program phase (e.g., based on the weigh adjustments from the training).

At block 414, the example SOM trainer 204 determines if a preset number of adjustments has been executed. If the example SOM trainer 204 determines that the preset number of adjustments has not been executed (block 414: NO), the process returns to block 402 to continue to train the SOM 202 based on additional event vectors. If the example SOM trainer 204 determines that the preset number of adjustments has not been executed (block 414: YES), the process ends (e.g., the SOM 202 is sufficiently trained). In some examples, the SOM trainer 204 may identify that the SOM 202 is sufficiently trained, but continue to adjust the weight vectors of the neurons while the attack determiner 108 identifies side-channel attacks.

FIG. 5 is an example flowchart 500 representative of example machine readable instructions that may be executed by the example implementation of the example hardware performance counter s104, the example event vector generator 106, and/or the attack determiner 108 of FIGS. 1 and/or 2 to identify a side-channel attack. Although the flowchart 500 of FIG. 5 is described in conjunction with the example hardware performance counters 104, the example event vector generator 106, and/or the attack determiner 108 of FIGS. 1 and/or 2, other type(s) of hardware performance counter(s), event vector generator(s), attack determiner(s), and/or other type(s) of processor(s) may be utilized instead.

At block 502, the example hardware performance counters 104 increment counters based on a task being performed by the example CPU 102. For example, the hardware performance counters 104 increment counts to detect program phases corresponding to the tasks being performed by the CPU 102. At block 504, the example event vector generator 106 generates an event vector based on the count of the counters corresponding to the performed task. For example, the event vector generator 106 utilize a lookup table that converts combination of counts into an event vector.

At block 506, the example vector-to-neuron processor 210 determines and/or infers the program phase from the event vector by mapping the event vector to a neuron based on the weight vector of the neuron. For example, if there is a direct match between the event vector and weight vector, the vector-to-neuron processor 210 may utilize a comparator to compare the event vector the weight vectors of the neuron to identify a match. In some examples, the vector-to-neuron processor 210 may determine a match by determining the distance (e.g., Euclidean distance, Mahalanobis distance, squared Euclidean distance, etc.) between the event vector and the weight vectors and selecting the neuron corresponding to the smallest distance.

At block 508, the example buffer processor 214 determines task pair(s) based on the neighbors of the mapped neuron. For example, the buffer processor 214 determines that if the mapped neuron is identified by '5' and the neighbors are identified by '3', '4,' '7', and '8,' the buffer processor 214 determines the task pairs to be (3, 5), (4, 5), (5, 7), and (5, 8). At block 510, the buffer processor 214 determines if the FIFO buffer 212 has enough space to store the task pairs and/or determines if the total count of task pairs exceeds a threshold (e.g., the total count corresponding to a preset amount corresponding to the size of the FIFO buffer 212). If the buffer processor 214 determines that the FIFO buffer 212 has enough space to store the task pairs (block 510: YES), the process continues to block 514. If the buffer processor 214 determines that the FIFO buffer 212 does not have enough space to store the task pairs (block 510: NO), the buffer processor 214 instructs the FIFO buffer 212 to discard the oldest task pair(s) (block 512). The FIFO buffer 212 discards a number of the oldest task pair(s) sufficient to store the new task pairs. Alternatively, when the FIFO buffer 212 stores counts corresponding to the task pairs, the FIFO buffer discards the oldest task pair(s) by decrementing a count corresponding to the oldest incremented task pair(s).

At block 514, the example FIFO buffer 212 stores the task pairs. Alternatively, the example FIFO buffer 212 may increment counts of the task/phase pairs stored in the FIFO buffer 212. At block 516, the example attack identifier 216 determines the counts of each unique task pair stored in the example FIFO buffer 212. For example, the attack identifier 216 may determine that there are four of a first task pair, two of a second task pair, and one of a third task pair and fourth task pair stored in the FIFO buffer 212. Alternatively, if the FIFO buffer 212 corresponds to counts of the phase/task pairs, the attack identifier 216 accesses the stored counts. At block 518, the example attack identifier 216 determines if there is a count that is higher (e.g., satisfies or exceeds) a threshold. For example, the attack identifier 216 may utilize a comparator to compare the counts to the preset threshold. The threshold is a preset threshold that corresponds to a side-channel attack. If the example attack identifier 216 determines that there is not a count of a task pair in the FIFO buffer 212 higher than the threshold (block 518: NO), the process returns to block 502 to continue to analyze tasks of the CPU 102.

If the example attack identifier 216 determines that there is a count of a task pair in the FIFO buffer 212 higher than the threshold (block 518: NO), the example attack identifier 216 identifies (e.g., flags) the attack (block 520). At block 522, the example mitigation technique selector 218 analyzes anomalies corresponding to the attack. For example, the mitigation technique selector 218 may determine a cache access phase pairs exceeding a threshold indicates that a cache-based side channel attack mitigation technique is needed. In some examples, the mitigation technique includes transmitting an alert to a user and/or administrator of the computing system 101. At block 524, the example mitigation techniques selector 218 selects a technique based on the anomalies. At block 526, the example SCA mitigator 110 performs the selected mitigation technique on the CPU 102.

Figure 6:
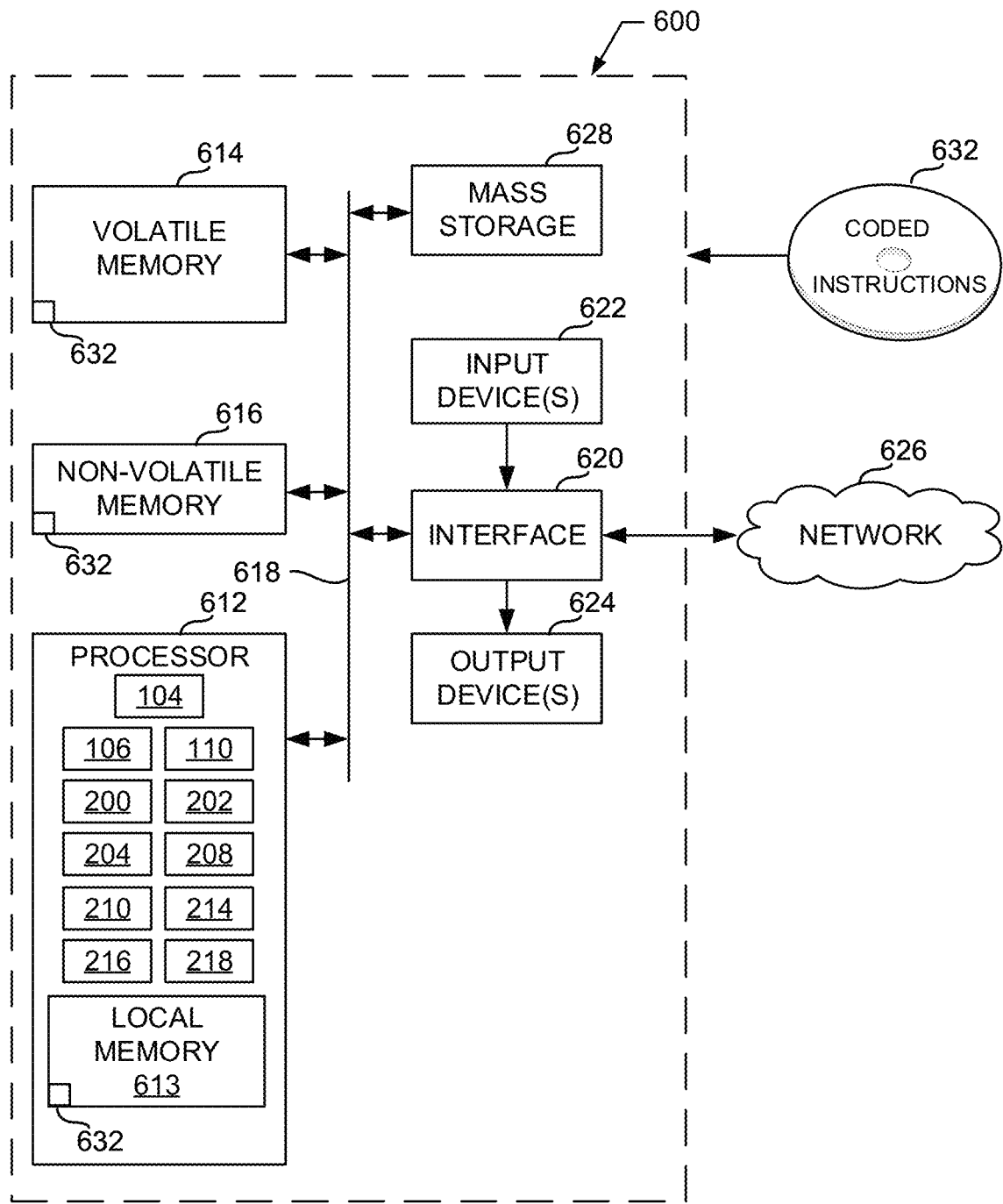
FIG. 6 is a block diagram of an example processor platform structured to execute the instructions of FIGS. 4 and/or 5 to implement the example attack determiner of FIGS. 1 and 2.

FIG. 6 is a block diagram of an example processor platform 600 structured to execute the instructions of FIG. 4-5 to implement the event vector generator 106 of FIG. 1, the SCA mitigator 110 of FIG. 1, and/or example attack determiner 108 of FIG. 2. The processor platform 600 can be, for example, a server, a personal computer, a workstation, a self-learning machine (e.g., a neural network), a mobile device (e.g., a cell phone, a smart phone, a tablet such as an iPad™), or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example hardware performance counters 104, the example event vector generator 106, the example SCA mitigator 110, the example interface 200, the example SOM 202, the example SOM trainer 204, the example distance determiner 206, the example weight adjuster 208, the example vector-to-neuron processor 210, the example attack identifier 216, the example buffer processor 214, and/or the example mitigation technique selector 218.

The processor 612 of the illustrated example includes a local memory 613 (e.g., a cache). In some examples, the local memory 613 implements the example FIFA buffer 212. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4-5 may be stored in the mass storage device 628, in the volatile memory 614, in the non-volatile memory 616, and/or on a removable non-transitory computer readable storage medium such as a CD or DVD.

Example 1 includes an apparatus to mitigate a side-channel attack, the apparatus comprising a vector-to-neuron processor to map an event vector to a neuron of a trained self-organizing map, a buffer processor to identify a task pair based on the neuron and an adjacent neuron of the neuron, a buffer to store data corresponding to the identified task pair, an attack identifier to, when information stored in the buffer corresponds to more than a threshold number of task pairs corresponding to the identified task pair, identify a malware attack, and a mitigation technique selector to select a technique for mitigating the malware attack.

Example 2 includes the apparatus of example 1, wherein the event vector corresponds to performance events characterizing program executions of a computing device corresponding to the event vector.

Example 3 includes the apparatus of example 1, further including mitigator to mitigate the attack based on the selected technique.

Example 4 includes the apparatus of example 1, wherein the malware attack is a side-channel attack.

Example 5 includes the apparatus of example 1, further including a self-organizing map trainer to train the self-organizing map by determining a distance between a second event vector and first weight vectors of neurons of the self-organizing map, selecting a winning neuron based on the smallest determined distance, and adjust at least one of the weight vector of the winning neuron or second weight vectors of neighboring neurons of the winning neuron based on the distance.

Example 6 includes the apparatus of example 1, wherein the data is first data and the buffer is to, when the buffer is full, discard second data corresponding to an oldest task pair prior to storing the task pair.

Example 7 includes the apparatus of example 6, wherein the buffer is to discard the second data corresponding to the oldest task pair by decrementing a stored counter corresponding to the oldest task pair.

Example 8 includes the apparatus of example 1, wherein the mapping of the event vector to the neuron infers a program phase of a computing device corresponding to the event vector.

Example 9 includes the apparatus of example 1, further including a hardware counter to increment a count based on tasks performed a computing device, and an event vector generator to generate the event vector based on the count.

Example 10 includes the apparatus of example 1, wherein the neuron and the adjacent neuron correspond to a similar execution sequence.

Example 11 includes the apparatus of example 1, wherein the buffer is to store the data corresponding to the identified task pair by incrementing a stored count corresponding to the identified task pair.

Example 12 includes the apparatus of example 1, wherein the data corresponding to the task pair corresponds to at least one of the task pair or a count corresponding to the task pair.

Example 13 includes a non-transitory computer readable storage medium comprising instructions which, when executed, cause a machine to at least map an event vector to a neuron of a trained self-organizing map, identify a task pair based on the neuron and an adjacent neuron of the neuron, store data corresponding to the identified task pair in a buffer, when information stored in the buffer corresponds to more than a threshold number of task pairs corresponding to the identified task pair, identify a malware attack, and select a technique for mitigating the malware attack.

Example 14 includes the computer readable storage medium of example 13, wherein the event vector corresponds to performance events characterizing program executions of a computing device corresponding to the event vector.

Example 15 includes the computer readable storage medium of example 13, wherein the instructions cause the machine to mitigate the attack based on the selected technique.

Example 16 includes the computer readable storage medium of example 13, wherein the malware attack is a side-channel attack.

Example 17 includes the computer readable storage medium of example 13, wherein the instructions cause the machine to train the self-organizing map by determining a distance between a second event vector and first weight vectors of neurons of the self-organizing map, selecting a winning neuron based on the smallest determined distance, and adjust at least one of the weight vector of the winning neuron or second weight vectors of neighboring neurons of the winning neuron based on the distance.

Example 18 includes the computer readable storage medium of example 13, wherein the data is first data and the instructions cause the machine to, when the buffer is full, discard second data corresponding to an oldest task pair prior to storing the task pair.

Example 19 includes a method to mitigate a side-channel attack, the method comprising mapping an event vector to a neuron of a trained self-organizing map, identifying a task pair based on the neuron and an adjacent neuron of the neuron, storing data corresponding to the identified task pair in a buffer, when information stored in the buffer corresponds to more than a threshold number of task pairs corresponding to the identified task pair, identifying a malware attack, and selecting a technique for mitigating the malware attack.

Example 20 includes the method of example 19, wherein the event vector corresponds to performance events characterizing program executions of a computing device corresponding to the event vector.

From the foregoing, it will be appreciated that example methods, apparatus and articles of manufacture have been disclosed detect side-channel attacks. The disclosed methods, apparatus and articles of manufacture improve security of computing devices by improving the efficiency of detection of side-channel attacks. Conventional techniques for detecting side-channel attacks detect signatures of known attacker programs. However, detecting signatures is not applicable for an increasingly growing number of new side-channel attacks. Other conventional techniques for detecting side-channel attacks include performing side-channel analysis techniques. However such conventional techniques adversely impact the performance of the normal programs. Examples disclosed herein detect side-channel attacks by leveraging unsupervised machine learning, thereby corresponding to a lightweight detector of side-channel attacks that is effective for both known and unknown attacks using different side-channels. Disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer-readable medium comprising instructions which, when executed, cause a computing device to perform operations comprising:
generating an event vector based on one or more counts corresponding to tasks performed by one or more processors of the computing device, wherein the event vector is generated using a lookup table, wherein the one or more counts correspond to one or more hardware performance events such that the lookup table corresponds to a combination of counts and event vectors;
determining distances between the event vector and weight vectors of neurons in a self-organizing map;
selecting a neuron of the neurons based on a determined distance;
identify one or more of the neurons that neighbor the selected neuron; and
updating a weight vector associated with the selected neuron or one or more weight vectors associated with the one or more neighboring neurons based on the determined distance.

2. The non-transitory computer-readable medium of claim 1, wherein the operations further comprise incrementing the one or more counts based on when the corresponding tasks are performed by the one or more processors.

3. The non-transitory computer-readable medium of claim 1, wherein the operations further comprise determining the distances using at least one of a Euclidean distance, a Mahalanobis distance, or a squared Euclidean distance, wherein the distances correspond to similarities between the neurons and the event vectors.

4. The non-transitory computer-readable medium of claim 1, wherein the neuron is selected based on a smallest distance.

5. The non-transitory computer-readable medium of claim 1, wherein the operations further comprise identifying the one or more neighboring neurons based on a two-dimensional grid representing positions of the neurons.

6. The non-transitory computer-readable medium of claim 1, wherein the event vector comprises a first event vector event, wherein the weight vector comprises a first weigh vector, wherein the weight vectors comprise first weight vectors, wherein the selected neuron comprises a first selected neuron, wherein the one or more neighboring neurons comprise one or more first neighboring neurons, wherein the determined distance comprise a first determined distance, and wherein the operations further comprise:
updating the first weight vector associated with the selected neuron or the first weight vectors associated with the one or more first neighboring neurons during a first iteration;
generating a second event vector in response to performing a second iteration; and
updating a second weight vector associated with a second selected neuron or second weight vectors associated with second neighboring neurons based on a second determined distance of associated with the second selected neuron.

7. An apparatus comprising:
one or more processors coupled to memory, the one or more processors to:
generate an event vector based on one or more counts corresponding to tasks performed by the one or more processors, wherein the event vector is generated using a lookup table, wherein the one or more counts correspond to one or more hardware performance events such that the lookup table corresponds to a combination of counts and event vectors;
determine distances between the event vector and weight vectors of neurons in a self-organizing map;
select a neuron of the neurons based on a determined distance;
identify one or more of the neurons that neighbor the selected neuron; and
update a weight vector associated with the selected neuron or one or more weight vectors associated with the one or more neighboring neurons based on the determined distance.

8. The apparatus of claim 7, wherein the one or more processors to increment the one or more counts based on when the corresponding tasks are performed by the one or more processors.

9. The apparatus of claim 7, wherein the one or more processors to determine the distances using at least one of a Euclidean distance, a Mahalanobis distance, or a squared Euclidean distance, wherein the distances correspond to similarities between the neurons and the event vectors.

10. The apparatus of claim 7, wherein the neuron is selected based on a smallest distance.

11. The apparatus of claim 7, wherein the one or more processors to identify the one or more neighboring neurons based on a two-dimensional grid representing positions of the neurons.

12. The apparatus of claim 7, wherein the event vector comprises a first event vector event, wherein the weight vector comprises a first weigh vector, wherein the weight vectors comprise first weight vectors, wherein the selected neuron comprises a first selected neuron, wherein the neighboring neurons comprise first neighboring neurons, wherein the determined distance comprise a first determined distance, and wherein the one or more processors to:
update the first weight vector associated with the selected neuron or the first weight vectors of associated with the one or more first neighboring neurons during a first iteration;
generate a second event vector in response to performing a second iteration; and
update a second weight vector associated with a second selected neuron or second weight vectors associated with the second neighboring neurons based on a second determined distance associated with the second selected neuron.

13. A method comprising:
generating an event vector based on one or more counts corresponding to tasks performed by one or more processors of a computing device, wherein the event vector is generated using a lookup table, wherein the one or more counts correspond to one or more hardware performance events such that the lookup table corresponds to a combination of counts and event vectors;
determining distances between the event vector and weight vectors of neurons in a self-organizing map;
selecting a neuron of the neurons based on a determined distance;
identifying one or more neurons that neighbor the selected neuron; and
updating a weight vector associated with the selected neuron or one or more weight vectors associated with the one or more neighboring neurons based on the determined distance.

14. The method of claim 13, further comprising incrementing the one or more counts based on when the corresponding tasks are performed by the one or more processors.

15. The method of claim 13, further comprising determining the distances using at least one of a Euclidean distance, a Mahalanobis distance, or a squared Euclidean distance, wherein the distances correspond to similarities between the neurons and the event vectors.

16. The method of claim 13, wherein the neuron is selected based on a smallest distance.

17. The method of claim 13, further comprising identifying the one or more neighboring neurons based on a two-dimensional grid representing positions of the neurons.

18. The method of claim 13, wherein the event vector comprises a first event vector event, wherein the weight vector comprises a first weigh vector, wherein the weight vectors comprise first weight vectors, wherein the selected neuron comprises a first selected neuron, wherein the neighboring neurons comprise first neighboring neurons, wherein the determined distance comprise a first determined distance, and wherein the method further comprises:
updating the first weight vector associated with the selected neuron or the first weight vectors associated with the one or more first neighboring neurons during a first iteration;

generating a second event vector in response to performing a second iteration; and updating a second weight vector associated with a second selected neuron or second weight vectors associated with the second neighboring neurons based on a second determined distance associated with the second selected neuron.

\* \* \* \* \*